May 14, 1946.  R. B. MacMULLIN ET AL  2,400,360
PROCESS FOR PRODUCING MAGNESIUM CHLORIDE LIQUORS
CONTAINING SUSPENDED CALCIUM CARBONATE
Filed May 21, 1942
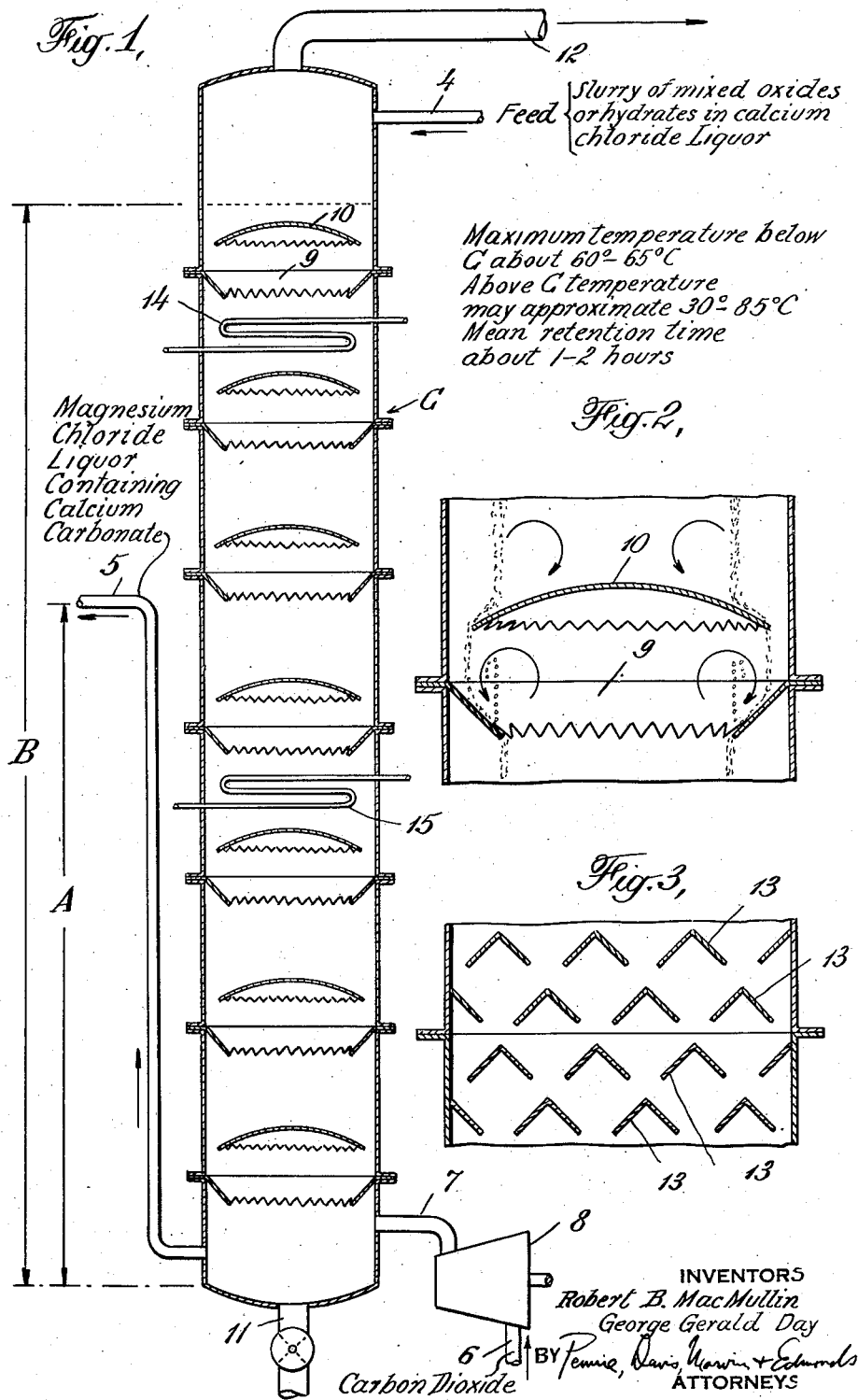

Patented May 14, 1946

2,400,360

UNITED STATES PATENT OFFICE 2,400,360

PROCESS FOR PRODUCING MAGNESIUM CHLORIDE LIQUORS CONTAINING SUSPENDED CALCIUM CARBONATE

Robert B. MacMullin and George Gerald Day, Niagara Falls, N. Y., assignors to The Mathieson Alkali Works, Inc., New York, N. Y., a corporation of Virginia Application May 21, 1942, Serial No. 443,918

6 Claims. (Cl. 23—66)

This invention relates to improvements in the production of magnesium chloride, the essential raw material for the production of metallic magnesium by electrolysis of the fused chloride. The invention provides important economies in the production of magnesium chloride and thus in the production of metallic magnesium. More particularly, this invention relates to improvements in the production of aqueous magnesium chloride liquors by reaction between the mixed oxides of magnesium and calcium produced by calcination of dolomite, the waste aqueous calcium chloride liquor from the ammonia soda process for example, and gas mixtures containing carbon dioxide.

In the presence of carbon dioxide, calcium chloride and the mixed oxides or hydrates of magnesium and calcium react to form calcium carbonate and magnesium chloride. The reaction is conveniently carried out with dolomite as raw material by calcining the dolomite to form the mixed oxides, adding the mixed oxides to an aqueous calcium chloride liquor to form a slurry of the mixed hydrates of magnesium and calcium in the calcium chloride liquor, carbonating this slurry and separating precipitated calcium carbonate from the resulting aqueous magnesium chloride liquor. The reactions involved may be summarized as follows:

I. $MgO + CaO + CaCl_2 + 2CO_2 \rightarrow 2CaCO_3 + MgCl_2$ 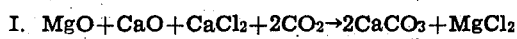

Since the ratio MgO:CaO varies in different dolomites, the proportion of carbon dioxide required to precipitate as carbonate the calcium present correspondingly varies from that indicated in the foregoing equation. This equation, however, correctly represents the reactions involved on the assumption of a chemical efficiency of 100%.

This invention consists of a new technique for carrying out this general type of process as a continuous process whereby improvements in chemical efficiency, and consequently economy, can be attained in practical operation of the process. In accordance with this invention: The aqueous slurry of mixed hydrates or mixed oxides and hydrates of magnesium and calcium containing calcium chloride is subjected to the action of a gas mixture containing upwards of 15% $CO_2$ in countercurrent flow in a compartmented tower arranged to maintain three or more segregated, substantial, liquid bodies of the slurry undergoing carbonation. The rate of flow of the slurry through the tower is so adjusted that the mean retention time, with respect to the total liquid phase in the several liquid bodies in the tower, is not less than about one hour, and may with advantage approximate one to two hours. The temperature in the tower below the level at which carbonation of calcium hydrate is approximately completed, in the lower two-thirds, approximately, of the tower, is limited to a maximum of about 60°–65° C. Also, in accordance with this invention, a relatively high temperature may be maintained in the upper part of the tower, for example by supplying the slurry to the tower at relatively high temperatures, to promote evaporation of water in the tower and to effect further concentration with respect to magnesium chloride of the aqueous magnesium chloride liquor produced in the tower. If a high temperature is thus maintained in the upper part of the tower, appropriate cooling is provided to limit the maximum temperature in the lower part of the tower as just described. High recoveries of magnesium chloride, with respect to the magnesium chloride potentially available, in the form of an aqueous solution of magnesium chloride of relatively high concentration, are thus obtained.

In carrying out this invention, the mixed oxides of magnesium and calcium, formed by calcining dolomite, are with advantage first hydrated with a proportion of water limited to produce a mixture of calcium hydrate and magnesium oxide, as follows:

II. $CaO + MgO + H_2O \rightarrow Ca(OH)_2 + MgO$ 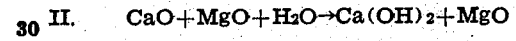

When this mixture is then added to the calcium chloride liquor, hydration of the magnesium oxide proceeds, as follows:

III. $MgO + H_2O \rightarrow Mg(OH)_2$ 

This reaction begins as soon as the mixture of calcium hydrate and magnesium oxide is added to the calcium chloride liquor and may continue after the slurry thus produced is introduced into the carbonation tower. The calcium hydrate being more soluble than the magnesium hydrate, carbonation of the calcium hydrate proceeds more rapidly in any event and may near completion in the upper part of the tower. The reaction is as follows:

IV. $Ca(OH)_2 + CO_2 \rightarrow CaCO_3 + H_2O$ 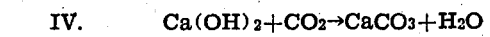

As carbonation of the calcium hydrate nears completion, carbonation of the magnesium hydrate begins. The magnesium hydrate is thus converted to the soluble bicarbonate, as follows:

V. $Mg(OH)_2 + CO_2 \rightarrow Mg(OH)(HCO_3)$ 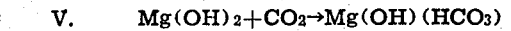

VI. $Mg(OH)(HCO_3) + CO_2 \rightleftharpoons Mg(HCO_3)_2$ 

The soluble magnesium bicarbonate thus produced reacts with the dissolved calcium chloride in the liquor to produce magnesium chloride and calcium bicarbonate, and the calcium bicarbonate, being unstable under the conditions prevailing in the carbonation tower, releases carbon dioxide which is reused locally within the tower and becomes insoluble calcium carbonate. The reactions are as follows:

VII. 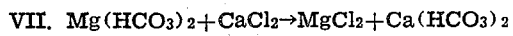  $Mg(HCO_3)_2 + CaCl_2 \rightarrow MgCl_2 + Ca(HCO_3)_2$

VIII. 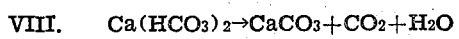 $Ca(HCO_3)_2 \rightarrow CaCO_3 + CO_2 + H_2O$

In the process of this invention the magnesium bicarbonate formed in the carbonation never attains substantial concentration because of the rapidity with which it reacts with the calcium chloride.

The foregoing reactions can be carried to completion in about an hour by processing isolated batches of the slurry of mixed hydrates of calcium and magnesium in the calcium chloride liquor at appropriate temperature. The rate of reaction is in general determined by the rate of hydrolysis of the carbon dioxide in the liquid phase and as a consequence the area of the interface between gas and liquid is but a minor factor whereas liquid volume is a major factor. Also the composition of the reacting mixture of gas and slurry tends to be substantially the same throughout an isolated batch. Thus, if an attempt is made to put the process on a continuous basis in a conventional reaction vessel, the discharged liquor will contain substantial proportions of unreacted materials unless the process is carried on very slowly, that is with a much greater time factor than is useful in batch operation.

Furthermore, Reaction VI, as indicated, is reversible. At temperatures below about 60°–65° C. the soluble magnesium bicarbonate tends to form but at higher temperatures the insoluble basic carbonate tends to form. Thus, after the carbonation of calcium hydrate is approximately complete, loss of chemical efficiency with respect to Reaction VII results to the extent that magnesium present is converted to the relatively insoluble and therefore relatively unreactive basic magnesium carbonate if this temperature, about 60°–65° C., is exceeded. However, higher temperatures, 80°–100° C. for example, can be maintained in the upper part of the tower to assist in evaporation of water and thus in concentration of the magnesium chloride liquor produced without prejudice to chemical efficiency if the maximum temperature of the liquid bodies in the lower part of the tower is limited, by appropriate cooling, to about 60°–65° C.

This invention makes it possible to carry out these reactions to produce magnesium chloride as a continuous process with high chemical efficiency and at rates comparable to those useful in the processing of isolated batches.

The invention will be further described in connection with the accompanying drawing which illustrates, diagrammatically and conventionally, apparatus appropriate for carrying out the process of the invention. In the drawing, Fig. 1 is an elevation in section through the vertical axes of a compartmented tower, Fig. 2 is an enlarged fragmentary detail of the tower illustrated in Fig. 1, and Fig. 3 is an enlarged fragmentary detail, similar to Fig. 2, of a modified construction.

Referring to the drawing: An aqueous slurry of mixed hydrates of magnesium and calcium, which may contain some magnesium oxide, in a calcium chloride liquor, formed for example by adding the mixed oxides of magnesium and calcium, or a hydrated or partially hydrated mixture of such oxides, produced by calcining dolomite, to the waste aqueous calcium chloride liquor from the ammonia soda process, is introduced into the upper end of the compartmented tower illustrated in Fig. 1 through connection 4. In operation, the liquid phase charge of the compartmented tower corresponds to a static head of the slurry equivalent to the elevation of the discharge connection 5, a distance A above the tower bottom. The tower is initially filled to the level corresponding to elevation A and a higher operating level corresponding approximately to elevation B is then maintained by the introduction through connections 6 and 7, including a turbocompressor 8, of the carbonating gas. The gas liberated by calcining the dolomite used for production of the mixed oxides, in a rotary kiln fired with coal or coke for example, and containing 15%–40% carbon dioxide for example, may be used as the carbonating gas. The tower is compartmented by successive pairs of rings 9 and caps 10 to maintain a series, six between the uppermost and lowermost pairs of rings and caps in the compartmented tower illustrated, of segregated, substantial, liquid bodies of the slurry undergoing carbonation in the tower. This division of the liquid phase charge in the carbonating tower establishes and maintains an effective countercurrent relationship between the reacting slurry and the carbonating gas and, although composition and concentration throughout each of the several segregated bodies may remain substantially the same, compels the reaction to follow an established gradient by preventing intermixture of more reacted slurry in lower compartments with less reacted slurry in higher compartments thus promoting high chemical efficiency. By the same means, the carbonating gas is redistributed as it enters each of the segregated bodies. The lower edges of the rings 9 and the caps 10 are serrated to promote distribution of the rising carbonating gas. The upper faces of the rings 9 are inclined to avoid accumulation of slurry solids in the passages between the segregated liquid bodies. Connection 11 is provided for blowing off solids from the bottom of the tower from time to time as may be required. A cooling medium may be circulated through coils 14 and 15 as required to maintain an appropriate temperature gradient. Or slurry may be withdrawn from corresponding sections of the tower and returned to the same section after passing through an external cooler to the same end. The aqueous magnesium chloride liquor including suspended calcium carbonate produced by the operation is discharged through connection 5. The carbonating gas, a gas mixture produced for example by calcination of dolomite in a kiln in which a carbonaceous or a hydrocarbon fuel is burned, will normally contain upwards of about 55% of the gases other than carbon dioxide, largely nitrogen, as the residue of the air supplied for combustion of the fuel. These other gases and any unreacted carbon dioxide become saturated with water vapor at the prevailing temperature as they pass through the tower and thus carry that proportion of water out of the tower as a component of the gas mixture escaping through connection 12, concentrating the liquor discharged from the tower in the same measure. The proportion of water thus removed may be increased by maintaining a relatively high temperature in the upper part of the tower, for example by introducing the slurry, through connection 4, at a temperature of 80°–85° C. The temperature of the slurry below level C in the tower is in any event limited to a maximum of about 60°–65° C. The rate of introduction of slurry through connection 4 is so regulated with reference to the aggregate liquid phase volume of the several segregated liquid bodies in the tower, allowing for water removed as just described, that the mean retention time with respect to the total liquid phase in the several liquid bodies is not less than one hour, e. g., about one–two hours. The tower should comprise at least three compartments, and in general the tower should contain about six compartments to realize fully the advantages of the invention. The gas pressure in the lower part of the tower is higher than that in the upper part of the tower by the amount of the differential necessary to maintain flow of the gas mixture through the tower, and this pressure gradient also assists in completing saturation of the slurry flowing downwardly through the tower with respect to carbon dioxide before it is discharged from the tower.

Instead of using pairs of rings and caps as illustrated in Figs. 1 and 2, the charge of slurry in the carbonating tower may be subdivided into a series of segregated liquid bodies by groups of angles 13 arranged as illustrated, for example, in Fig. 3. As there illustrated, the angles 13 are arranged in horizontal rows, the angles in one row being staggered with respect to those in the adjacent row or rows, and the sides of the angle being downwardly inclined to facilitate the movement downwardly through the tower of any slurry solids which might otherwise tend to separate and accumulate in the tower. The lower edges of these angles, which may be serrated, also facilitate the distribution of the carbonating gas.

A tower such as that illustrated in Fig. 1 may for example be about 9 feet in diameter, the elevation A may be about 34 feet and the elevation B about 54 feet. In a tower of such dimensions, at least 6 feet should be allowed above the operating level in the top of the tower to provide for disengagement of suspended or entrained liquid particles. The superficial velocity of the carbonating gas may approximate 1 foot per second per square foot of tower cross section.

The following example will illustrate one practical application of the invention in apparatus of the type shown in Figs. 1 and 2: A mixture of calcium hydrate and magnesium oxide was prepared by calcining dolomite in a rotary kiln fired with pulverized coal, crushing the calcined product, hydrating the crushed product with a limited proportion of water, grinding the hydrated product and air-separating a mixture of calcium hydrate and magnesium oxide to eliminate material too coarse to pass about a 65-mesh screen. The ratio MgO:CaO of the mixture was about 1.060 (as determined by the standard sugar test). This mixture of calcium hydrate and magnesium oxide was suspended in ammonia soda waste liquor containing calcium chloride and sodium chloride from which sodium sulphate in solid form had previously been separated by settling to produce the slurry supplied to the carbonating tower. This slurry was supplied to the upper end of the carbonating tower. A gas mixture containing about 30% carbon dioxide was forced into the bottom of the carbonating tower at a rate such that the carbon dioxide content of the gas mixture escaping from the top of the tower was between about 5% and 10% after equilibrium had been established. After equilibrium had been established, simultaneous samples were taken adjacent each of the seven rings and of the supply slurry and discharge slurry and the temperatures at the points of sampling were noted. The several temperatures, the analyses of the several samples and the conversions indicated are shown in the following tabulation. In this tabulation the samples of the reacting slurry are identified by reference to the ring adjacent which the particular sample was taken, the rings being numbered from the top of the tower to the bottom of the tower. The analyses are reported in gram equivalents per kilogram of slurry, the conversion in percent of the total calcium originally present as calcium chloride, and the temperature in degrees C.

*Table*

|  | Calcium chloride | Total chloride | Ratio calcium chloride: total chloride | Conversion | Temperature |
| --- | --- | --- | --- | --- | --- |
| Feed slurry | 1.81 | 2.38 | 0.761 | 0 | 28 |
| Ring #1 | 1.57 | 2.31 | .680 | 11 | 51 |
| Ring #2 | 1.20 | 2.36 | .509 | 33 | 54 |
| Ring #3 | 0.74 | 2.36 | .313 | 59 | 56 |
| Ring #4 | 0.33 | 2.33 | .142 | 81 | 60 |
| Ring #5 | 0.03 | 2.36 | .013 | 98 | 61 |
| Ring #6 | 0.00 | 2.36 | 0 | 100 | 59 |
| Ring #7 | 0.00 | 2.34 | 0 | 100 | 56 |
| Discharge slurry | 0.00 | 2.36 | 0 | 100 | 56 |

The carbon dioxide content of the effluent gas mixture approximated 6.7%. The magnesium chloride content of the discharged slurry was 1.91 gram equivalents per kilogram of slurry, the total chloride content of the discharged slurry was 1.24 gram equivalents per kilogram of slurry and the ratio $MgCl_2$:total chloride of the discharged slurry was 0.809. The excess of the ratio $MgCl_2$:total chloride of the discharge slurry over the ratio $CaCl_2$:total chloride of the supply slurry was due to the presence of a small proportion of magnesium chloride in the supply slurry and of a small proportion of magnesium carbonate in the discharge slurry. Magnesium oxide in excess of that required for reaction with the calcium chloride present was present to the extent of about 12%. About 83% of the carbon dioxide forced into the tower was absorbed therein. The mean retention time with respect to the liquid phase in the tower was about 70–80 minutes.

In the foregoing example, the carbonating gas and the supply slurry were introduced into the carbonation tower at approximately, or slightly above, atmospheric temperature, and the tower was not internally cooled. The heat of carbonation nevertheless brought the slurry to the indicated elevated temperatures as it passed through the carbonation tower. As an example illustrating another practical application of the invention in such apparatus, the operation was carried out as described in the foregoing example except that the supply slurry was heated to about 85° C. before introduction into the carbonation tower and the temperature in the lower part of the tower, that is in the compartments below Ring 2, was limited to a maximum of 63% C. by regulated circulation of cooling water through the cooling coils. The cooling of the slurry was assisted by the evaporation occurring in the upper part of the tower. Similar results were obtained plus a further concentration with respect to magnesium chloride of the discharge slurry.

In one aspect, the efficiency of the operation can be measured by the inactive magnesium oxide content of the discharge slurry. The discharge slurry from the carbonation tower is filtered to separate suspended solids, principally calcium carbonate and usually a small proportion of magnesium oxide, from the magnesium chloride liquor. The inactive magnesium oxide content of the discharge slurry is conveniently determined as the MgO content of the solids separated from the magnesium chloride liquor by filtration. As further examples illustrating the practical application of the invention in apparatus of the type shown in the drawing, the operations being carried out as previously described with the supply slurry at a temperature of about 37°–39° C., without internal cooling the heat of carbonation brought the discharge slurry to a temperature of about 64° C. and the inactive magnesium oxide content of the discharge slurry was 16.5% by weight on the solids filtered from the discharge slurry on a dry basis, whereas with internal cooling limiting the maximum temperature of the lower part of the tower to about 60°–65° C. the temperature of the discharge slurry was about 49° C. and the inactive magnesium oxide content of the discharge slurry was about 5.6%. The two operations were substantially identical except in that internal cooling was provided in one and not in the other.

In carrying out the invention, high chemical efficiency is obtained only with liquid phase retention times of about one hour or more and this period of one hour has therefore been described as an approximate minimum. One of the important improvements of the invention is nevertheless the reduction in liquid phase retention time it makes possible in continuous operation with high chemical efficiency.

We claim:

1. In the continuous carbonation of aqueous slurries of mixed hydrates of magnesium and calcium containing calcium chloride to produce aqueous magnesium chloride liquors containing suspended calcium carbonate, the improvement which comprises flowing the slurry downwardly through a series of substantially segregated substantial liquid bodies each of substantial depth in a tower while passing a gas mixture containing carbon dioxide upwardly through the tower and in intimate and distributed contact with the slurry in such bodies, limiting the maximum temperature in the lower part of the tower to about 60°–65° C. and regulating the rate of flow of the slurry so that the mean retention time with respect to liquid phase in the several bodies aggregates not less than about one hour.

2. In the continuous carbonation of aqueous slurries of mixed hydrates of magnesium and calcium containing calcium chloride to produce aqueous magnesium chloride liquors containing suspended calcium carbonate, the improvement which comprises flowing the slurry downwardly through a series of substantially segregated substantial liquid bodies each of substantial depth in a tower while passing a gas mixture containing carbon dioxide upwardly through the tower and in intimate and distributed contact with the slurry in such bodies, limiting the maximum temperature in the lower two-thirds of the tower to about 60°–65° C. and regulating the rate of flow of the slurry so that the mean retention time with respect to liquid phase in the several bodies aggregates not less than about one hour.

3. In the continuous carbonation of aqueous slurries of mixed hydrates of magnesium and calcium containing calcium chloride to produce aqueous magnesium chloride liquors containing suspended calcium carbonate, the improvement which comprises flowing the slurry downwardly through a series of substantially segregated substantial liquid bodies each of substantial depth in a tower while passing a gas mixture containing carbon dioxide upwardly through the tower and in intimate and distributed contact with the slurry in such bodies, limiting the maximum temperature below the level at which carbonation of calcium hydrate is approximately complete to about 60°–65° C. and regulating the rate of flow of the slurry so that the mean retention time with respect to liquid phase in the several bodies approximates one to two hours.

4. In the continuous carbonation of aqueous slurries of mixed hydrates of magnesium and calcium containing calcium chloride to produce aqueous magnesium chloride liquors containing suspended calcium carbonate, the improvement which comprises flowing the slurry downwardly through a series of not less than three substantially segregated substantial liquid bodies each of substantial depth in a tower while passing a gas mixture containing carbon dioxide upwardly through the tower and in intimate and distributed contact with the slurry in such bodies, limiting the maximum temperature in the lower two-thirds of the tower to about 60°–65° C. and regulating the rate of flow of the slurry so that the mean retention time with respect to liquid phase in the several bodies aggregates not less than about one hour.

5. In the continuous carbonation of aqueous slurries of mixed hydrates of magnesium and calcium containing calcium chloride to produce aqueous magnesium chloride liquors containing suspended calcium carbonate, the improvement which comprises flowing the slurry downwardly through a series of substantially segregated substantial liquid bodies each of substantial depth in a tower while passing a gas mixture containing carbon dioxide upwardly through the tower and in intimate and distributed contact with the slurry in such bodies, maintaining a temperature approximating 80°–100° C. in the upper part of the tower while limiting the maximum temperature in the lower part of the tower to about 60°–65° C. and regulating the rate of flow of the slurry so that the mean retention time with respect to liquid phase in the several bodies aggregates not less than about one hour.

6. In the continuous carbonation of aqueous slurries of mixed hydrates of magnesium and calcium containing calcium chloride to produce aqueous magnesium chloride liquors containing suspended calcium carbonate, the improvement which comprises flowing the slurry downwardly through a series of substantially segregated substantial liquid bodies each of substantial depth in a tower while passing a gas mixture containing carbon dioxide upwardly through the tower and in intimate and distributed contact with the slurry in such bodies, maintaining a temperature approximating 80°–100° C. in the upper part of the tower while limiting the maximum temperature in the lower part of the tower to about 60–65° C. and regulating the rate of flow of the slurry so that the mean retention time with respect to liquid phase in the several bodies approximates one to two hours.

ROBERT B. MacMULLIN.
GEORGE GERALD DAY.